May 5, 1964 A. LORENZ Re. 25,567

HIGH VACUUM PUMPS

Original Filed Dec. 26, 1956 6 Sheets-Sheet 1

INVENTOR.
ALBERT LORENZ

BY

Christie, Parker & Hale
ATTORNEYS

May 5, 1964 A. LORENZ Re. 25,567

HIGH VACUUM PUMPS

Original Filed Dec. 26, 1956 6 Sheets-Sheet 2

INVENTOR.
ALBERT LORENZ

BY

Christie, Parker & Hale
ATTORNEYS

May 5, 1964

A. LORENZ

Re. 25,567

HIGH VACUUM PUMPS

Original Filed Dec. 26, 1956

6 Sheets-Sheet 3

INVENTOR.
ALBERT LORENZ

BY

Christie, Parker & Hale
ATTORNEYS

HIGH VACUUM PUMPS

Original Filed Dec. 26, 1956 6 Sheets-Sheet 4

INVENTOR.
ALBERT LORENZ

BY

Christie, Parker & Hale
ATTORNEYS

INVENTOR.
ALBERT LORENZ

BY

Christie, Parker & Hale
ATTORNEYS

INVENTOR.
ALBERT LORENZ

BY

Christie, Parker & Hale
ATTORNEYS

United States Patent Office

Re. 25,567
Reissued May 5, 1964

25,567
HIGH VACUUM PUMPS

Albert Lorenz, Hanau am Main, Salisueg, Germany, assignor to W. C. Heraeus G.m.b.H., Hanau, Germany Original No. 2,937,807, dated May 24, 1960, Ser. No. 630,496, Dec. 26, 1956. Application for reissue Aug. 3, 1961, Ser. No. 130,233
9 Claims. (Cl. 230—139)

Matter enclosed in heavy brackets [ ] appears in the original patent but forms no part of this reissue specification; matter printed in italics indicates the additions made by reissue.

This invention relates to high vacuum pumps of the Root's type, and is a continuation-in-part application of my copending application Serial No. 490,316, filed February 24, 1955, now abandoned.

Root's type pumps (also known as Connersville blowers) have been in use for many years, and are described in technical literature such as "Industrial Chemistry," by E. R. Riegel, Reinhold Publishing Corporation, pp. 696–7. In the typical Root's pump, a pair of parallel and laterally spaced shafts are [journalled] *journaled* in a casing which has an inlet and an outlet. Separate impellers mounted on each shaft mesh as the shafts are rotated and sweep fluid from the inlet to the outlet. At least one, and more usually, both, of the shafts are [journalled] *journaled* through the casing wall, and are sealed by suitable packing glands. Such pumps have been used in the past principally for moving relatively large volumes of liquid or gas under atmospheric or higher pressures and at moderate rotational speeds, say, several hundred revolutions per minute.

This invention provides Root's type vacuum pumps which can handle large volumes of gas at pressures from about 10 mm. Hg to below $10^{-4}$ mm. Hg. This vacuum range has been handled in the past by combinations of prior art mechanical vacuum pumps and vapor-operated ejector or diffusion pumps. Prior art mechanical pumps are effective in the range from atmospheric pressure down to a few mm. Hg, and the vapor-operated pumps are required to extend the vacuum into the range from about 1 mm. Hg. to less than $10^{-4}$ mm. Hg.

The vacuum pumps of this invention operate most efficiently in the range beginning where the efficiency of previous mechanical pumps drops off, i.e., a few mm. Hg, and continue to operate efficiently well into the vacuum range now handled effectively only by vapor-operated pumps. Moreover, the pumps of this invention operate without using a pumping vapor, and thereby avoid the difficulty of back-diffusion of vapor which is always present in systems using vapor operated pumps. Thus, by using a suitable "backing" or fore-vacuum pump, which may be of the conventional mechanical type, in combination with one or more pumps of this invention, entirely mechanical vacuum pumping system are provided which handle large volumes of gas from atmospheric pressure to less than $10^{-4}$ mm. Hg. Such systems are particularly suitable for various industrial vacuum plants, such as vacuum drying, melting of metals, and coating.

Briefly, the invention provides Root's type pumps adapted to operate at sub-atmospheric pressures and at high rotational speeds, say several thousand revolutions per minute, for prolonged operational periods. It is the high rotational speed which makes it possible for the pumps of this invention to operate so effectively as vacuum pumps. Previous Root's type pumps have not been able to operate at sufficiently high rotational speeds due to the packing glands provided around the shafts where they pass through the pump casing. This invention eliminates the requirement of packing glands or any type of sliding seal between the rotating shafts and the pump casing through which they pass by surrounding that portion of the casing with a vacuum tight housing and maintaining in the housing a sub-atmospheric gaseous pressure.

Thus, the pressure differential across the pump casing at the point where the shaft passes through it is maintained at a small fraction of the total pressure differential between the surrounding atmosphere and the pressure maintained within the pump. This arrangement permits the shaft to rotate freely and without any confinement or friction due to packing material, thereby permitting relatively small and inexpensive motors to drive the pump impellers at high rotational speeds for prolonged periods, and without ever requiring adjustment or replacement of packing [gland.] *glands.*

These and other aspects of the invention will be more fully understood from the following detailed description taken in conjunction with the accompanying drawings in which.

Figure 1:
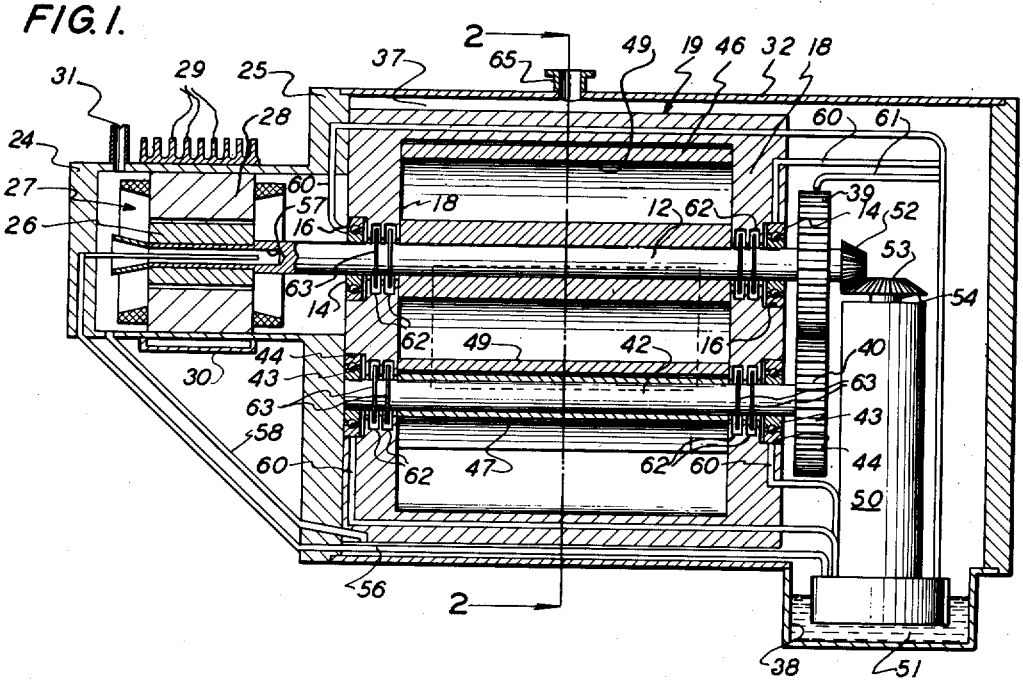
FIG. 1 is a vertical section of one embodiment of this invention in which a single motor drives the pump.
Figure 2:
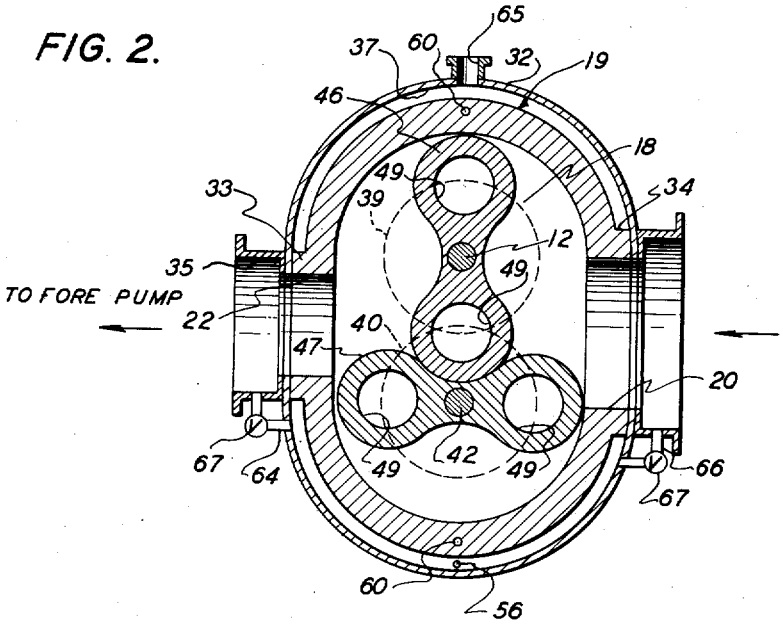
FIG. 2 is a view taken on line 2—2 of FIG. 1.

Referring to FIGS. 1 and 2, a horizontal drive shaft 12 is [journalled] *journaled* at opposite ends in separate roller bearings 14 mounted in respective openings 16 in end walls 18 of a pump casing 19 having an inlet 20 and an outlet 22 adapted to be connected to a fore-pump (not shown). The inlets and outlets are at diametrically opposed points in the central portion of the pump casing. The pump casing is of oval cross section, and the inlet is somewhat larger than the outlet.

The left end (as viewed in FIG. 1) of the drive shaft extends outwardly from the pump casing and is surrounded by a first vacuum tight housing 24 secured by a flange 25 to the left end wall of the pump casing. A rotor 26 of an electric motor 27 is attached to the left end of the pump drive shaft and is coaxially disposed within a stator 28 of the motor. The motor is supplied power through electric leads (not shown) sealed through the wall of the first housing. Cooling fins 29 and a cooling jacket 30, which may be supplied cooling water by suitable conduits (not shown), surround the first housing. The first housing is adapted to be evacuated through a conduit 31 which leads to a suitable vacuum system (not shown).

A second vacuum tight housing 32 is disposed over the right hand end of the pump casing. The second housing is spaced from the right hand end of the pump casing and from the intermediate portion of the pump casing and is sealed at its left hand end to the outermost portion of the first housing flange which projects outwardly of the left hand end of the pump casing. The housing is also sealed to an outwardly extending boss 33, which surrounds the pump casing outlet, and to an outwardly extending boss 34, which surrounds the casing inlet. The housing has an outlet 35 and an inlet 36 which are collinear with the casing outlet and inlet, respectively. Thus, there is a space 37 between the intermediate portion of the pump casing and the second housing, and between the right hand ends of the pump casing and second housing. A sump 38 is in the bottom of the right hand end of the second housing. A drive gear 39 is connected near the right hand end of the pump drive shaft, which extends beyond the end of the pump casing. Gear 39 meshes with a driven gear 40 which is mounted on the right hand end of a second shaft 42 [journalled] *journaled* at opposite ends in bearings 43 located in openings 44 of the pump casing end walls.

First and second Root's type impellers 46, 47, are, respectively, mounted on the first and second pump shafts. Each impeller has a pair of longitudinal bores 49 to reduce the mass of the impellers, and thereby facilitate the operation of the pump at high rotational speeds.

A vertical lubricating pump 50 has its lower end immersed in a pool of lubricant 51 in the sump. The pump is driven by a first bevel gear 52 located on the extreme right hand end of the shaft 12 and meshing with a horizontal bevel gear 53 attached to the upper end of a vertical lubricating pump drive shaft 54. The lubricant both lubricates and cools the vacuum pump, and is supplied through a conduit 56 to the interior of a bore 57 in the left hand end of drive shaft 12. The fluid flows out conduit 56, and back out of the left hand end of bore 57 where it then drains through a conduit 58 to return to the sump. Each of the four shaft bearings are supplied lubricant through conduit 60, and gears 39 and 40 are supplied lubricant through conduit 61. Preferably, the lubricating oil has a low vapor pressure to avoid adverse effects on the ultimate vacuum produced by the pump. Various organic oils used in condensation vacuum pumps, for example, "Apiezon" oil, are suitable.

Each shaft opening in the casing end walls includes a pair of annular grooves 62 located between the casing interior and the adjacent roller bearing. Each groove receives the outer periphery of a respective disk or baffle 63 attached to the shafts. The discs are thinner than the width of the grooves so that no contact exists between the discs and the grooves. Thus, the grooves and baffles impede the diffusion of gas between the pump casing interior and the spaces enclosed between housings.

The space between the pump casing and the second housing may be evacuated by providing a conduit 64 (see FIG. 2) which connects the space with the housing outlet, which in turn is connected to a fore pump (not shown) that maintains the pump outlet at sub-atmospheric pressure. The space between the pump casing and the second housing may also be kept under sub-atmospheric pressure through a conduit 65 which is adapted to be connected to a suitable vacuum pump (not shown), or the space may be connected to the inlet side of the pump through a conduit 66. Both conduits 64 and 66 each have a valve 67 to permit their optional operation.

As can be appreciated from the foregoing description, the pump of FIGS. 1 and 2 can be operated at extremely high rotational speeds due to the absence of any sliding or friction seals around the shafts. The spaces within the two housings are evacuated to sufficiently low pressures, so that gas within them flows by diffusion rather than by pressure differential. Thus, there is little flow of gas through the shaft openings, and the flow of gas is further reduced by the presence of the labyrinth seal arrangement.

Figure 3:
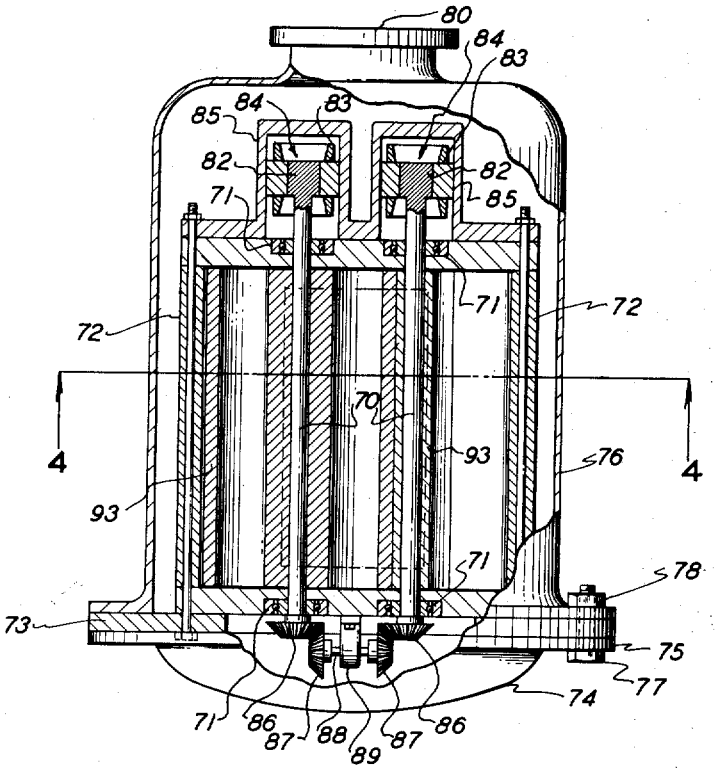
FIG. 3 is an elevation partially broken away and partially in section of a pump of this invention using a separate motor for each shaft.
Figure 4:
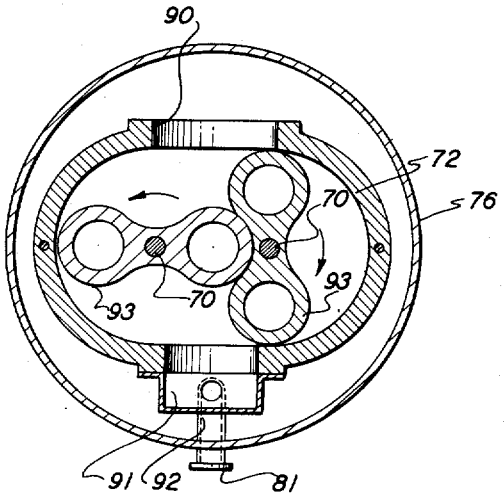
FIG. 4 is a view taken on line 4—4 of FIG. 3.

In the pump of FIGS. 3 and 4, a pair of vertical and laterally spaced shafts 70 are [journalled] *journaled* at their respective upper and lower ends on roller bearings 71 supported in the upper and lower end walls of upright pump casing 72, the lower end of which rests on an inwardly extending annular flange 73 of a base 74 which has an outwardly extending flange 75 and an upwardly opening concave central portion. A bell jar type housing 76 is disposed over the upper portion of the pump casing and is secured by bolts 77 and nuts 78 to flange 75 of the base. The housing has an inlet 80 at its upper end and an outlet 81 in an intermediate portion. The upper ends of the shafts project above the pump casing and are each provided with a rotor 82 formed integrally on their upper ends. Each rotor is coaxially disposed within a stator 83 to form an electric motor 84 which is supplied power through suitable leads (not shown) sealed through the walls of a motor housing 85 disposed over each of the motors and sealed to the upper end of the pump casing. A separate bevel gear 86 is attached to the lower end of each shaft beneath the casing, and engages respective synchronizing gears 87 located at opposite ends of a rotatable horizontal synchronizing shaft 88, supported in a bearing 89 attached to the bottom of the pump casing.

The pump casing has an inlet 90 which opens into the space between the housing and casing, and it has an outlet 91 which is sealed from the space between the housing and pump casing and connected to the housing outlet by a conduit 92. A separate Root's type impeller 93 is mounted on each of the shafts.

Thus, with the pump of FIGS. 3 and 4, the shafts are [are] driven by separate motors at a uniform speed, which is insured by the synchronizing gears. The pumped gas enters the inlet at the upper end of the housing and passes into the pump through the pump casing inlet. The impellers move the gas to the pump outlet where it is discharged from the housing outlet through conduit 92. As with the pump of FIGS. 1 and 2, the shafts rotate freely in the openings in the casing walls through which they pass.

Figure 5:
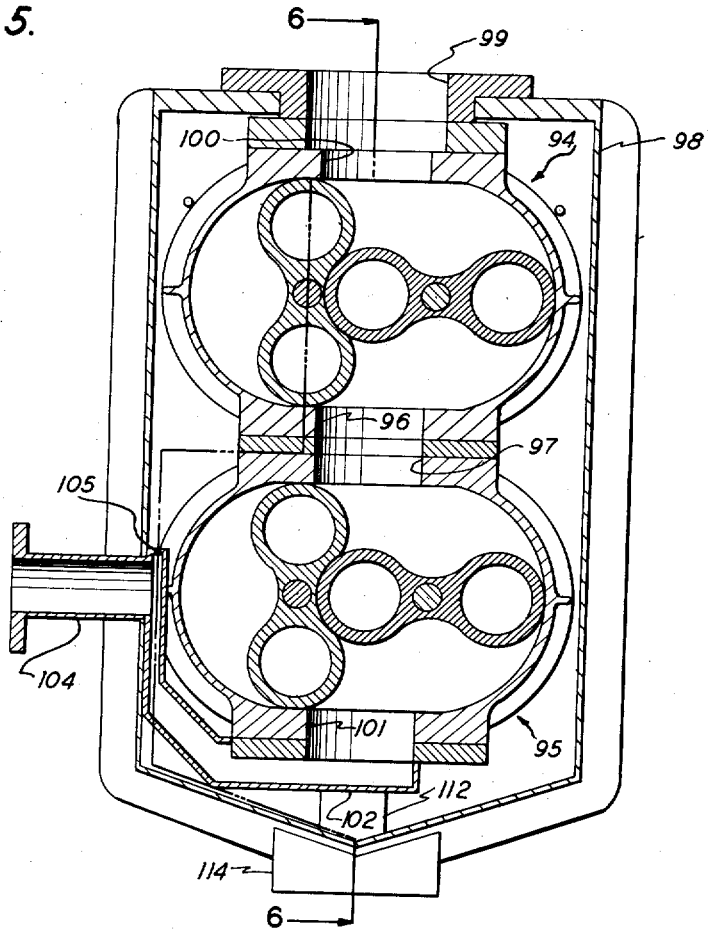
FIG. 5 is a longitudinal sectional view of a pumping system which includes a two-stage arrangement of two pumps of this invention which are connected in series.
Figure 6:
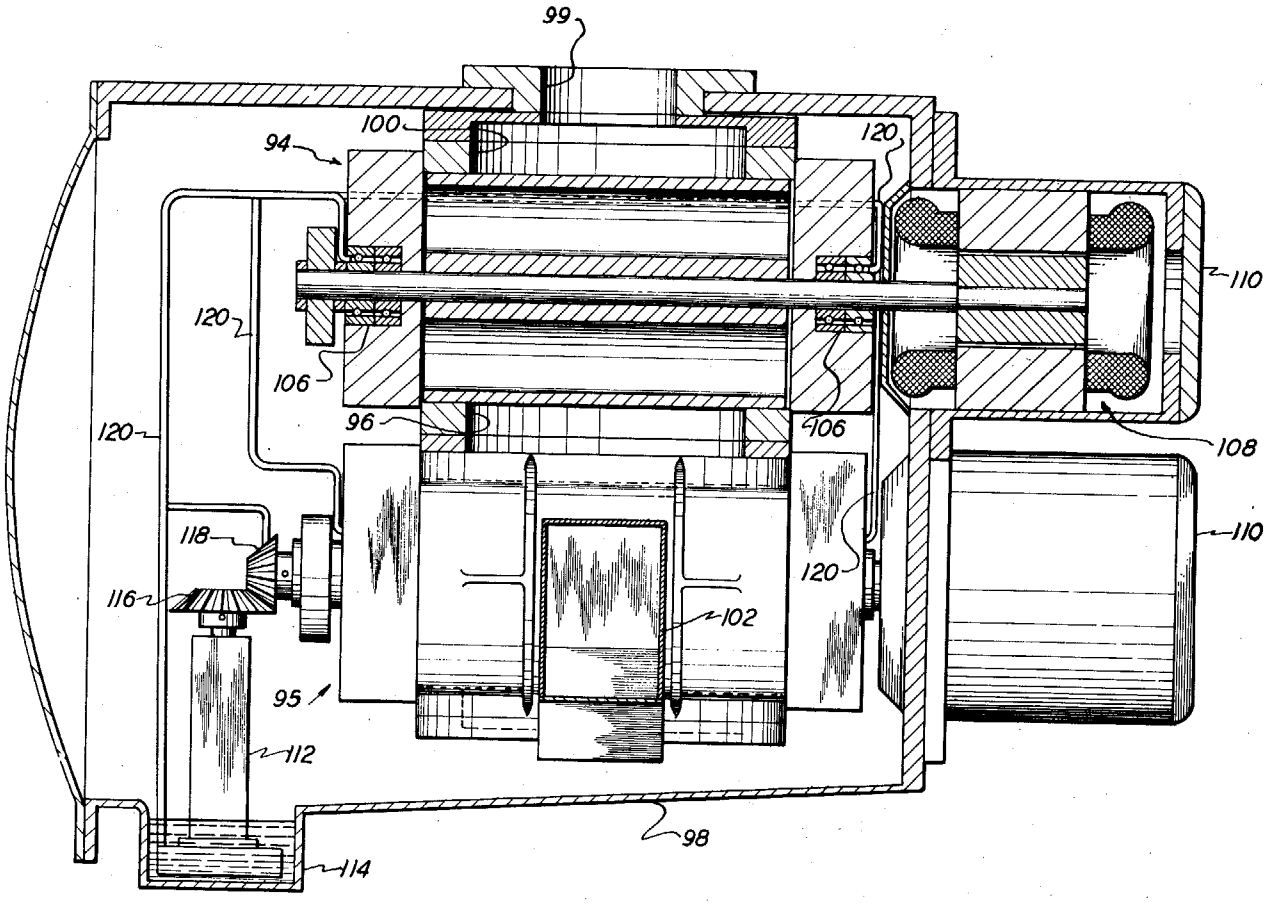
FIG. 6 is a view taken on line 6—6 of FIG. 5.
Figure 7:
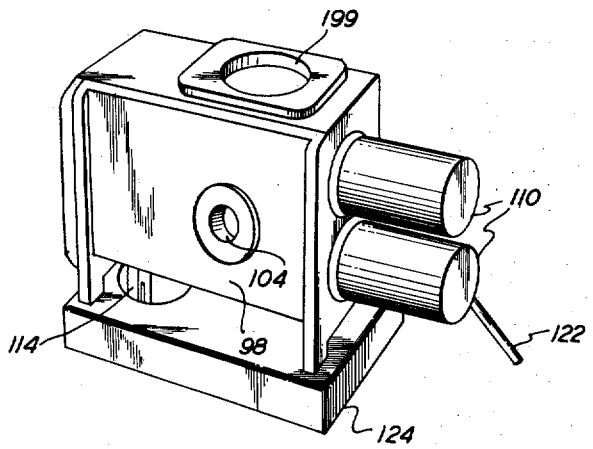
FIG. 7 is a perspective view of the pumping arrangement of FIGS. 5 and 6.

Referring to FIGS. 5 through 7, a first Root's type pump 94 is mounted vertically over a second Root's type pump 95, the outlet 96 of the first pump being connected to the inlet 97 of the second pump. Both pumps are entirely surrounded by an outer housing 98 which is spaced from the pumps. An inlet 99 is formed in the upper end of the housing, and is connected to the inlet 100 of the first pump. The outlet 101 of the second pump is connected through a conduit 102 to an outlet 104 in the side of the housing.

A small aperture 105 in conduit 102 permits the pressure in the space between the housing and the pump casing to be reduced to below atmospheric pressure.

Each of the pump shafts are [journalled] *journaled* through their respective pump casings on suitable bearings 106 and spaced from the openings through the pump casings to permit free rotation of the shafts. Each pump has a motor 108 on a drive shaft as described with respect to FIG. 1, and each motor is sealed inside a motor housing 110 so that there is little pressure differential across the casing at the point where the shaft passes through the casing. A vertical lubricating pump 112 has its lower end located in a sump 114 of the pump housing, and is adapted to be driven by a bevel gear 116, which in turn is driven by a bevel gear 118 on the end of the drive shaft of the lower pump. As with the lubricating system of FIG. 1, the pump 112 supplies lubricant to each of the bearings and gears through conduits 120.

Electric power is supplied to the motors of the pumps of FIGS. 5 through 7 by an electric cable 122 (shown only in FIG. 7). Also, as shown in FIG. 7, the entire pump assembly is mounted on a base 124.

Figure 8:
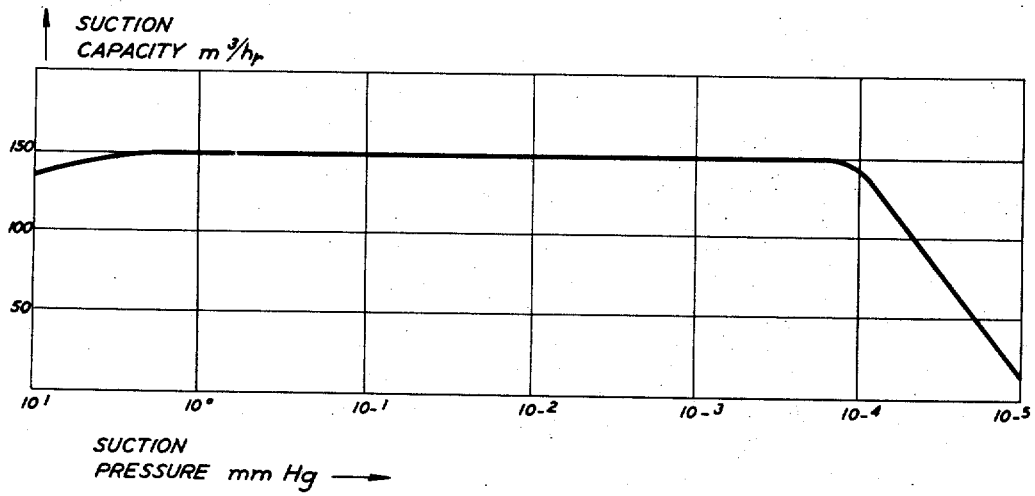
FIG. 8 is a performance curve of the pumping arrangement shown in FIGS. 5 through 7.

FIG. 8 is a plot of the operating characteristics of the two-stage pumping apparatus of FIGS. 5 through 7, in which its suction or pumping capacity is shown in cubic meters per hour on the vertical axis and suction pressure (pressure developed at the inlet of the low pressure pump) is shown in mm. Hg on the horizontal axis. The curve illustrates an important advantage of the system shown in FIGS. 5 through 7, namely, that the pumping capacity of the arrangement is substantially constant over a range of more than 1 mm. Hg to almost $10^{-4}$ mm. Hg. Moreover, the performance of this arrangement corresponds to the theoretical product of rotational speed and impeller displacement volume. Such efficiency is not known with conventional mechanical pumps of the prior art.

One pumping system constructed as shown in FIGS. 5 through 7 pumped air at the rate of 152 cubic meters (4,100 cubic feet) per [hours] *hour* with a speed of 3,000 revolutions per minute. The two motors each required 160 watts of 60 c.p.s. three phase alternating current when the pump was working against a maximum fore-vacuum pressure of 20 mm. Hg at its high pressure side. A larger system of the same type shown in FIGS. 5 through 7 was tested and found to pump with a speed of 1,600 cubic meters (43,000 cubic feet) per hour at 3,000 revolutions per minute, requiring power of 1 kilowatt when the system was operating against a maximum fore-vacuum pressure of 10 mm. Hg. An even larger system with a pumping capacity of 6,000 cubic meters (162,000 cubic feet) per hour was constructed and tested. This system operated on 2 kilowatts at 3,000 revolutions per minute against a maximum fore-vacuum pressure of 5 mm. Hg. The pistons of the foregoing systems were dimensioned so that a play of .01 mm. to 1 mm. and preferably about .1 mm. was provided between the impellers and pump casing walls, as well as between the two impellers during all phases of rotation.

Figure 9:
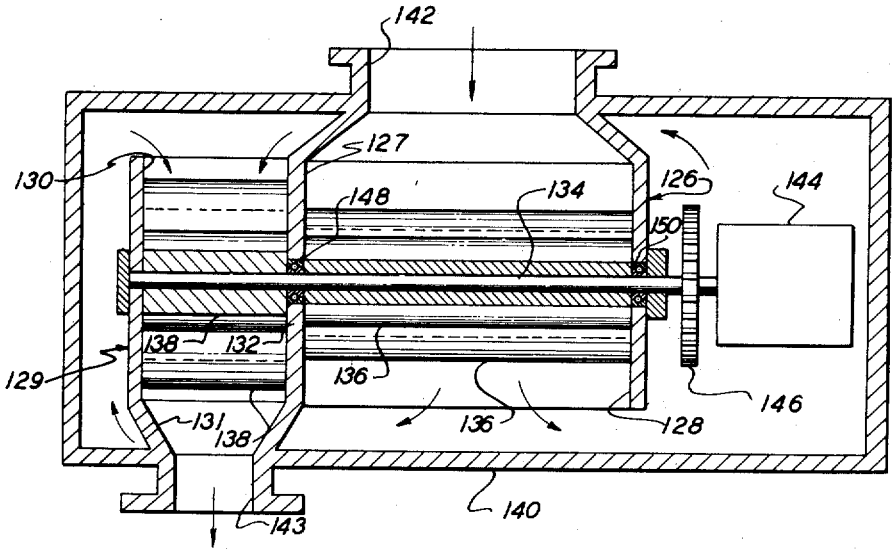
FIG. 9 is a schematic sectional elevation of a pumping system in which two Root's type pumps are connected in series and are each driven by common shafts.

FIG. 9 shows another pumping arrangement of two Root's type pumps constructed in accordance with this invention. For the sake of clarity, the arrangement is shown schematically, since most of the features of the individual pumps are evident from the various preceding detailed descriptions. In the arrangement of FIG. 9, a low pressure Root's type pump 126 having an inlet 127 and an outlet 128 is disposed adjacent a high pressure Root's type pump 129 having an inlet 130 and an outlet 131. The two pumps have a common side wall 132, and are each powered by a pair of common parallel, and laterally spaced shafts 134 (only one shaft is shown in FIG. 9) which are [journalled] *journaled* through the end walls of each pump casing and through the common wall 132. A pair of impellers 136 are mounted on the shafts inside the low pressure pump casing, and a pair of impellers 138 are mounted on the shafts within the high pressure pump casing. Both pumps are enclosed by a common housing 140 which has an inlet 142 connected to the inlet of the low pressure pump, and an outlet 143 connected to the outlet of the high pressure pump. The outlet of the low pressure pump discharges into the common housing, and the inlet of the high pressure pump opens into the common housing so that gas is pumped through the low pressure pump, into the housing, and through the high pressure pump. The pumps are powered by a motor 144, and their respective impellers are synchronized by gears 146 (only one gear is shown in FIG. 9). The shafts are also supported by suitable bearings 148 and 150 in the walls of the pump casing, and are spaced from the pump casing walls as with the previously described embodiments.

Preferably, the inlet opening of the housing is considerably larger than the housing outlet. For example, the median diameter of the cross section of the housing inlet should be of the order of magnitude of the mean free path of the gas molecules being pumped, e.g., it should be at least several centimeters wide, and preferably, several decimeters. Preferably, the cross sectional area of the housing outlet is considerably smaller than the housing inlet.

The Root's pumps constructed in accordance with this invention need no valves between the pre-vacuum pumps and the container to be evacuated, because at the beginning of an evacuation operation, and down to approximately 20 mm. Hg, the Root's pump offers no major resistance to the gas being pumped from the container by the pre-vacuum pump. The clearances between the impellers and the Root's pumps are large enough so that gas can flow through the pumps almost without resistance at pressures above 20 mm. Hg, and the Root's pump impellers are rotated slowly without the drive being turned on. When the pressure drop across the Root's pump becomes less than 1 mm. Hg, the resistance to gas flow becomes greater, and the pump impellers no longer rotate without being driven by their own motors. However, at this stage of operation, the gas pressure in the Root's pumps is sufficiently low to be within good operating range for the pumps, and they are turned on. Thus, the container to be evacuated, the Root's pumps, and the pre-vacuum pumps may be connected in series without requiring any valves. The container is first evacuated by the pre-vacuum pump down to about 1 mm. Hg without any substantial resistance to gas flow through the Root's pumps. The Root's pumps are then turned on to aid the pre-vacuum pump, and the pressure in the container may be readily reduced to $10^{-4}$ mm. Hg.

I claim:

1. A high vacuum pump system comprising [an impermeable] *a vacuum* outer housing, at least one pump unit within the housing including a pump casing having an inlet and an outlet, a pair of rotatable shafts journaled in the casing, the casing having at least one opening through which one of the shafts extends outside the casing and a separate impeller on each shaft within the casing, the impellers being adapted to mesh when the shafts are rotated and drive a gas from the inlet toward the outlet, *the opening being of larger diameter than the shaft extending therethrough for forming a gap between the casing and the shaft to prevent sliding contact therebetween,* means [within the housing] for rotating the shaft which extends through the opening in the casing, and means for maintaining a gaseous atmosphere at subatmospheric pressure within the housing around the opening in the casing.

2. Apparatus as defined in claim 1 including baffle means on the shaft where it passes through the opening to reduce diffusion of gas molecules through the opening.

3. Apparatus as defined in claim 2 wherein the baffle means includes a disc on the shaft, the casing having a groove in the portion of the casing forming the opening, the disc projecting into the groove, the groove being wider than the disc to prevent sliding contact between the rotating disc and the casing.

4. Apparatus as defined in claim 1 further comprising an additional pump unit within the housing including a casing having an inlet and an outlet, a pair of rotatable shafts journaled in the casing, the casing having at least one opening through which one of the shafts extends outside the casing, and a separate impeller on each shaft within the casing, the impellers being adapted to mesh when the shafts are rotated, means [within the housing] for rotating the shaft which extends through the opening in the casing of said additional pump, and means for connecting the outlet in the casing of one pump and to the inlet in the casing of the other pump unit.

5. A mechanical high vacuum pump of the Root's type comprising a pump casing having an inlet and an outlet, a pair of shafts mounted for rotation within the casing, the casing having at least one opening through which one of the shafts extends outside the casing, the opening being of larger diameter than the shaft extending therethrough for forming a gap between the casing and the shaft to prevent sliding contact therebetween, a separate impeller mounted on each shaft, the impellers being adapted to mesh when the shafts are rotated and drive a gas from the inlet toward the outlet, means disposed outside of the casing and coupled to the shaft extending through the opening for rotating the shaft, [an impermeable outer] *a vacuum* housing sealed around the opening in the casing through which the shaft extends, and means for maintaining a gaseous atmosphere at sub-atmospheric pressure within the housing to maintain the pressure differential across the opening in the casing at a small fraction of the total pressure differential existing between the surrounding atmosphere and the interior of the pump casing whereby the opening and the shaft are effectively sealed against gas leakage without the use of packing glands.

6. A high vacuum pump system as defined in claim 5 wherein the shafts are journaled in ball bearings secured to the casing, one of the ball bearings being disposed in the opening through which said one shaft extends and wherein the means for rotating the shaft includes a motor disposed in the housing and operatively connected to the shaft which extends through the opening.

7. A vacuum pump system comprising at least one mechanical high vacuum pump unit of the Root's type including a pump casing having an inlet and an outlet, a pair of shafts mounted for rotation within the casing, the casing having at least two openings through which the respective shafts extend outside the casing, a separate impeller mounted on each shaft within the casing, the impellers being adapted to mesh when the shafts are rotated and drive a gas from the inlet toward the outlet, impermeable housing means sealed around the openings in the casing through which the shafts extend, at least two co-operating gears disposed outside the casing and within the housing means and coupled to the shafts extending outside the casing for synchronizing the rotation of the impellers, driving means disposed within the housing means and connected to one of the shafts for rotating said shaft, and means for maintaining a gaseous atmosphere at sub-atmospheric pressure within the housing means to seal the openings in the casing against appreciable gas leakage without the use of sliding seals between the rotating shafts and the openings in the pump casing.

8. Apparatus as defined in claim 7 further comprising an additional pump unit of the Root's type which includes a casing having an inlet and an outlet, a pair of shafts mounted for rotation within the casing, the casing having at least two openings through which the respective shafts extend outside the casing, a separate impeller mounted on each shaft within the casing, the impellers being adapted to mesh when the shafts are rotated and drive a gas from the inlet toward the outlet, at least two co-operating gears disposed outside the casing and within said impermeable housing means and coupled to the shafts of the second pump unit extending outside the casing for synchronizing the rotation of the impellers, driving means disposed within said impermeable housing means and connected to one of the shafts of the second pump unit for rotating said shaft, and means for connecting the outlet in the casing of one pump unit to the inlet in the casing of the other pump unit.

*9. A high vacuum pump system comprising a pump casing having an inlet and an outlet, a rotatable vacuum pump mounted within the casing and including at least one shaft, the casing having at least one opening through which the shafts extends outside the casing, the opening being of larger diameter than the shaft extending therethrough for forming a gap between the casing and the shaft to prevent sliding contact therebetween, a vacuum housing extending at least over the opening in the casing and means for maintaining a gaseous atmosphere at sub-atmospheric pressure within the housing to maintain the pressure differential across the opening in the casing at a small fraction of the total pressure differential existing between the surrounding atmosphere and the interior of the pump casing whereby the opening and the shaft are effectively sealed against gas leakage without the use of packing glands.*

References Cited in the file of this patent or the original patent

UNITED STATES PATENTS

| | | |
|---|---|---|
| Re. 21,189 | Price | Aug. 29, 1939 |
| 877,093 | Kugel | Jan. 21, 1908 |
| 1,038,075 | Berrenberg | Sept. 10, 1912 |
| 1,315,233 | Needham | Sept. 9, 1919 |
| 1,531,607 | Green | Mar. 31, 1925 |
| 1,641,840 | Enyart | Sept. 6, 1927 |
| 1,656,917 | Kucher | Jan. 24, 1928 |
| 1,669,050 | Grant | May 8, 1928 |
| 1,737,942 | Pagel | Dec. 3, 1929 |
| 1,934,189 | Grier | Nov. 7, 1933 |
| 2,044,873 | Beust | June 23, 1936 |
| 2,062,035 | McCormack | Nov. 24, 1936 |
| 2,062,045 | Van Deventer | Nov. 24, 1936 |
| 2,246,276 | Davidson | June 17, 1941 |
| 2,413,035 | De Lancey | Dec. 24, 1946 |
| 2,440,593 | Miller | Apr. 27, 1948 |
| 2,492,075 | Van Atta | Dec. 20, 1949 |
| 2,545,600 | Berry | Mar. 20, 1951 |
| 2,596,640 | Berry | May 13, 1952 |
| 2,603,161 | Lloyd | July 15, 1952 |
| 2,697,402 | Lindquist | Dec. 21, 1954 |
| 2,721,694 | Van Atta | Oct. 25, 1955 |
| 2,721,747 | Whitfield | Oct. 25, 1955 |
| 2,772,638 | Nagely | Dec. 4, 1956 |
| 2,937,807 | Lorenz | May 24, 1960 |
| 2,938,664 | Noller | May 31, 1960 |

FOREIGN PATENTS

| | | |
|---|---|---|
| 1,021,530 | Germany | Dec. 27, 1957 |